United States Patent [19]

Davies

[11] Patent Number: 4,666,304
[45] Date of Patent: May 19, 1987

[54] OPTICAL MEASUREMENT APPARATUS

[75] Inventor: David E. N. Davies, Hempstead, England

[73] Assignee: National Research Development Corporation, London, England

[21] Appl. No.: 744,057

[22] Filed: Jun. 12, 1985

[30] Foreign Application Priority Data

Jun. 14, 1984 [GB] United Kingdom ............... 8415127

[51] Int. Cl.$^4$ ............................................. G01B 11/14
[52] U.S. Cl. ................................... 356/375; 250/201; 250/227
[58] Field of Search ................. 356/375; 250/201 AF, 250/227

[56] References Cited

U.S. PATENT DOCUMENTS 4,488,813 12/1984 Kissinger et al. .................... 356/375

FOREIGN PATENT DOCUMENTS 2077921 12/1981 United Kingdom ......... 250/201 AF

Primary Examiner—R. A. Rosenberger
Assistant Examiner—Crystal D. Cooper
Attorney, Agent, or Firm—Cushman, Darby & Cushman

[57] ABSTRACT

Optical measurement apparatus, for example for the measurement of displacement, comprises a radiation source 2 coupled to an optical fibre 1 connected to a sensing head 12 comprising a Y-coupler 8 supplying an optic fibre tip 5 and a parallel path incorporating a delay 10 and terminating in a tip 11. A lens 4 of appropriate focal length is positioned between tip 5 and a reflector 3 to focus light onto reflector 3 so that the amount of light reflected back to tip 5 is a function of the position of the reflector. A signal detector 6 is also coupled to fibre to detect and measure the reflected light. Tip 11 is positioned at the focus of lens 4 so that the light reflected back to tip 11 is independent of the position of reflector 3. The ratio of the two reflected signals detected in detector 6 is calculated to give the position of reflector 3 with compensation for the effects of deterioration of the parts of the apparatus in which there is a common path for the two quantities of light.

7 Claims, 2 Drawing Figures

OPTICAL MEASUREMENT APPARATUS

BACKGROUND OF THE INVENTION

1. Field of the Invention

This invention relates to optical measurement apparatus and has application in the measurement of displacement, for example in pressure sensors in which pressure is indicated by the displacement of a diaphragm.

2. Description of Related Art

One known arrangement for measuring displacement comprises an optical fibre the tip of which is positioned to direct light transmitted along the fibre onto a reflection element or a transmission element the displacement of which is to be measured. A reflection element may comprise a diaphragm or membrane having a reflecting surface and forming part of a pressurised enclosure. The optical system is arranged so that the change in the amount of light reflected or transmitted is a measure of the displacement of the element. The reflected or transmitted light is measured and its value indicated to give a measure of displacement or pressure. Desirably the optical system is arranged so that the change in reflected or transmitted light is linearly related to displacement.

While a sensor of the kind described above is accurate immediately after calibration it will be appreciated that the magnitude of the detected signal depends not only on the position of the element but also on any change in the quality of the optical path that occurs after calibration. The path and its constituents may be subject to ageing which will affect the accuracy of the measurement.

It is an object of the invention to provide compensation for the effects of such change in quality.

SUMMARY OF THE INVENTION

According to the invention optical measurement apparatus comprises a radiation source, an optical fibre coupled to said radiation source the end of which fibre remote from the source is directed onto an element the reflection from which is to be measured, an auxiliary path for radiation from said source parallel to the said remote end of said optical fibre, which auxiliary path is arranged so that the magnitude of the signal present therein after reflection from the element is independent of the position of the element, signal delay means which introduces a signal delay between signals from the said remote end and signals from the auxiliary path, and signal detector means for detecting both the delayed and the undelayed signals.

In carrying out the invention a Y-coupler may be included in the said optical fibre from which the said auxiliary radiation path bifurcates. It may be convenient for the Y-coupler, the radiation delay means and the remote end of the fibre to be contained in a sensing head. The apparatus may include a plurality of different sensing heads each supplied from an associated Y-coupled positioned in the optical fibre and each arranged to provide measurements of a different element.

In a preferred embodiment of the invention means are provided for enabling the radiation source to provide narrow pulses of radiation and the delay means has a delay time for the radiation equal to at least half the length of a pulse so that the radiation received at the signal detector means after traversing the respective paths is in the form of two time separated pulses.

In an alternative preferred embodiment of the invention modulation means are provided for enabling the radiation source to provide a continuous output which is modulated so that the radiation received at the signal detector means after traversing the respective paths is a composite modulated signal the phase of modulation of which lags the phase of the modulation of the output from the source. Conveniently the modulation means comprises amplitude modulation means.

BRIEF DESCRIPTION OF THE DRAWINGS

In order that the invention may be more fully understood reference will now be made to the accompanying drawing in which.

DETAILED DESCRIPTION OF THE PRESENTLY PREFERRED EXEMPLARY EMBODIMENTS

Figure 1:
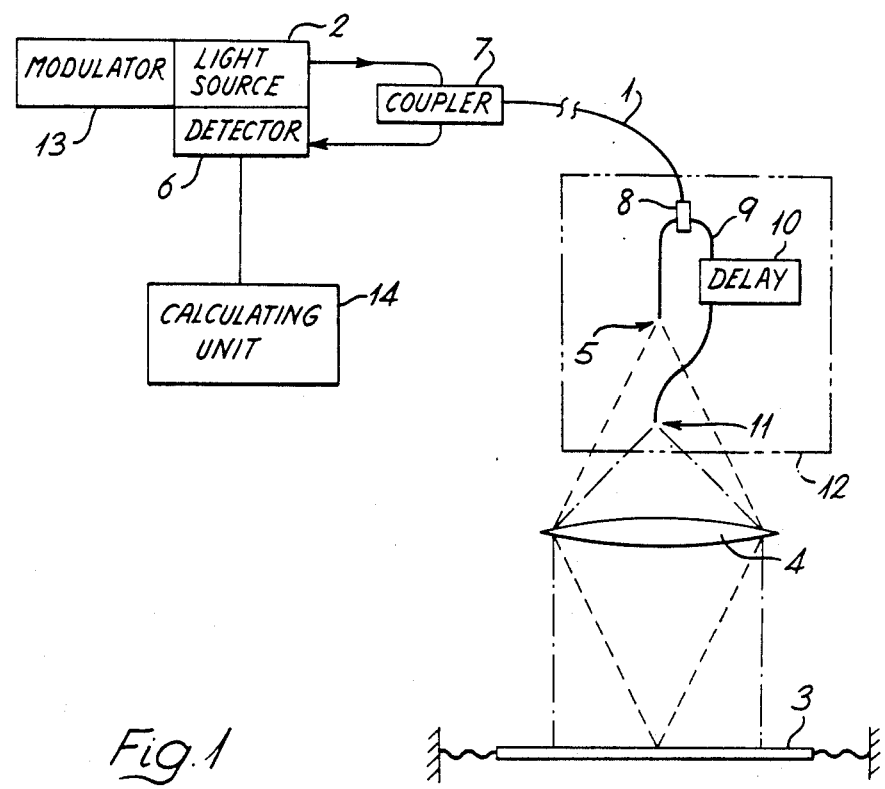
FIG. 1 illustrates an embodiment of the invention.

Referring now to FIG. 1 there is shown therein an optical displacement sensor comprising an optical fibre 1 to which is coupled a light emitting source 2 such as a light emitting diode through one arm of a Y-coupler 7. It is desired to measure the displacement of a reflective membrane 3 which may form part of a gastight enclosure for example. A lens 4 is provided of focal length f and the tip 5 of fibre 1 remote from light source 2 is positioned at a distance 2 f from the lens and likewise the lens is positioned at a distance 2 f from membrane 3. The light emitted from tip 5 of fibre 1 will thus be brought to a focus on the surface of the membrane and displacement of membrane 3 from the focal point will cause a change in the magnitude of the light reflected back from membrane 3 through lens 4 to tip 5 of fibre 1. For small deflections at least the change in the amount of light reflected back to tip 5 of fibre 1 is linearly related to the displacement of membrane 3.

The reflected light will return along fibre 1 and can be detected in a detector 6 coupled to fibre 1 through the other arm of Y-coupler 7. The change in the amount of light that is detected in detector 6 will therefore be proportional to the displacement of membrane 3 for small deflections of the membrane from the focal plane of the light passing through lens 4.

Close to tip 5 of fibre 1 a Y-coupler 8 is provided and part of the light from light source 1 is directed to a parallel path comprising a short length 9 of optical fibre which passes through a radiation delay means 10 to the tip 11 of optical fibre 9 which is positioned at a distance f from lens 4. The light from tip 11 therefore emerges as a parallel ray and is directed onto the surface of reflector 3. Reflector 3 will return this light back to the focal point of lens 4 where the tip 11 of fibre 9 is positioned and this light will therefore pass back through delay means 10 and along the fibre 9, Y-coupler 8 and fibre 1 to the light detector 6. Thus light detector 6 receives reflected light back both from tip 5 and tip 11. It may be convenient to incorporate Y-coupler 8, delay 10 and the two optical fibre tips 5 and 11 within a single sensor head 12. Delay means 10 can conveniently be a length of optical fibre wound on a reel.

That portion of the light that is diverted through fibre 9 and reflected back will have a magntidue which will be independent of the position of membrane 3. It will however be affected by any ageing or other deterioration of reflector 3 as well as any other component in the path common to the light from both tip 5 and tip 11. This common path comprises light source 2, fibre 1, reflector 3 and detector 6. The magnitude of the signal reflected back from tip 5 will be likewise affected by deterioration of the common path and in the absence of compensation this will be manifest as an error in the position of membrane 3. To compensate for the error the magnitude of the signal from tip 5 is divided by the magnitude of the signal from tip 11. This calculation is carried out in a calculation unit 14 and for this purpose it is necessary to be able to derive separate values representing the two signals.

A modulator 13 is provided to modulate light source 2 so that the reflected signal amplitudes can be separated. Modulator 13 may operate in various modes. One mode is to pulse modulate light source 2 so that it provides a train of narrow pulses of light separated from each other by intervals which are somewhat greater than the length of each individual light pulse. The length of each light pulse is arranged to be less than twice the delay time of delay means 10 so that the pulses detected in detector 6 will comprise time separated pulses successive ones of which will have been reflected back through tip 5 and tip 11 respectively. The displayed or indicated output value of the sensing device is the quotient of the magnitudes of the two received pulses. Thus any deterioration of the common path of the light pulses including light source 2, the length of optical fibre 1, detector 6 and the quality of reflection from reflector 3 which would indicate an incorrect reading of the position of membrane 3 will cause corresponding change in the magnitudes of pulses reflected both into tip 5 and tip 11 so that the ratio of these pulses will be constant for any given position of membrane 3 despite any attenuation due to deterioration of the items referred to above.

As an alternative to pulse modulation the output of light source 2 is continuous and is envelope modulated by a single frequency sine wave. The two signals reflected back from tip 5 and tip 11 respectively will combine vectorially to give a single demodulated sine wave at detector 6. The phase angle between the two components of the signal which are derived from reflections signal through tip 5 and tip 11 will depend on the modulation frequency of modulator 13 and the magnitude of the delay means 10. It is possible and convenient to choose a modulation frequency such that the two reflected component signals have a modulation phase difference of 90°. It is not however necessary for the phase difference to be 90° provided that the difference is known. Since the time delay introduced by the delay means is known it is readily possible to select a modulation frequency giving a 90° phase difference.

By selection of appropriate modulation frequencies it is possible to process out or reduce the effects of spurious and multiple reflections. Use of a wide range of modulation frequencies will also allow the system to address more than one sensor at the end of a single fibre link. The apparatus described above consists of one sensor head incorporating two emitters 5 and 11 with emitter 11 acting as a reference to emitter 5. Varying the modulation frequency will allow the interrogation of further emitter-pairs spaced along the same fibre link.

Figure 2:
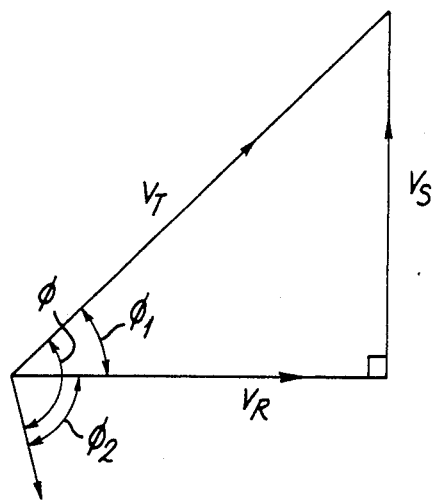
FIG. 2 is a vector diagram explanatory of one embodiment of the invention.

The resultant vector diagram of the received signal for a 90° phase difference is shown in FIG. 2 where $V_S$ is the signal received from tip 5 and $V_R$ is the reference signal received from tip 11. The signal detected in detector 6 will be the resultant of these two components and is indicated at $V_T$. The magnitude of the received signal $V_T$ is measured at detector 6 and its phase relative to the transmitted modulation frequency, indicated as the angle $\phi$. It is desired to know the relative magnitudes of the components $V_S$ and $V_R$ so that the ratio of these components can be calculated as giving the position of membrane 3 with compensation. To do this it is necessary to know the angle $\Phi_1$ between $V_T$ and $V_R$. However the only angle that can be directly measured is the angle $\phi$ between $V_T$ and the phase of the transmitted modulation signal from modulator 13.

The angle $\phi$ is made up to two separate angles one of these is the required angle $\Phi_1$ and the other is a fixed angle $\Phi_2$ being the angle between $V_R$ and the phase of modulator 13. $\Phi_2$ is fixed for a particular configuration of apparatus and in order to measure it the tip 5 of fibre 1 can be blanked off in calibration procedure so that the only signal received back at detector 6 is the signal $V_R$. The phase angle $\phi$ that is now measured will in this case be equal to the angle $\Phi_2$ so that in use of the apparatus it is necessary only to measure angle $\phi$ and subtract from it the already known value of the angle $\Phi_2$ in order to derive the angle $\Phi_1$.

In the amplitude modulation CW mode of operation of the equipment the calculating unit thus stores the value of the angle $\Phi_2$ and calculates the value of the angle $\Phi_1$ from measurement of the angle $\Phi$. The necessary trigonometrical calculation of $V_R$ and $V_S$ from the measured value of $V_T$ is then carried out to give the required value of $V_S/V_R$. In general the CW method is more sensitive than the pulse method since the CW method operates with a much narrower bandwidth.

With the CW method an alternative calibration technique to determine the angle $\Phi_1$ is possible which can be applied at any time during the sensor's operation. By varying the modulation frequency to two return signals $V_S$ and $V_R$ can be brought into line, either in phase or in anti-phase. Both of these conditions can be identified since, for any given sensor state, they correspond to the maximum and minimum values for the resultant magnitude respectively. In either position the phase angle of the resultant is now $\Phi_2$, the required calibration angle. This technique can also be used as the basis for an alternative signal processing method which avoids the need for an accurate phase angle measurement. With the return signals in phase the magnitude of the resultant is given by $(V_S+V_R)$, and in anti-phase by $(V_S-V_R)$, which can be denoted $V_{T1}$ and $V_{T2}$ respectively. These two values can be measured at the appropriate modulation frequencies. The required ratio $V_S/V_R$ is now given by $(V_{T1}+V_{T2})/(V_{T1}-V_{T2})$. The mathematical functions can be performed electronically using either analogue or digital techniques.

While the displacement sensor described and illustrated with respect to FIG. 1 measures light reflected back from a reflecting surface it will be appreciated that a sensor can be used in a transmission mode with the magnitude of the light in one parallel path being dependent on the position of a transducer, and the magnitude of the light in the other parallel path being independent of transducer position.

The above technique has been described in terms of sensing displacements but it can be applied to any sensor mechanism which varies the amount of light reflected back or transmitted through a fibre-optic link. This includes sensors based on variable transmission through a section of fibre due to the variation in absorption and scanner losses, and sensors which rely on some external optical component such as an optically-active crystal. Any form of intensity-based fibre-optic sensor can be referenced using the above technique.

What is claimed is:

1. Optical measurement apparatus comprising a radiation source, an optical fibre coupled to said radiation source the end of which fibre remote from the source is directed onto an element the reflection from which is to be measured, an auxiliary path for radiation from said source parallel to the said remote end of said optical fibre, which auxiliary path is arranged so that the magnitude of the signal present therein after reflection from the element is independent of the position of the element, signal delay means which introduces a signal delay between signals from the said remote end and signals from the auxiliary path, and signal detector means for detecting both the delayed and the undelayed signals.

2. Apparatus as claimed in claim 1 in which a Y-coupler is included in the said optical fibre from which the said auxiliary path bifuricates.

3. Apparatus as claimed in claim 2 in which a Y-coupler the signal delay means and the remote end of the fibre are contained in a sensing head.

4. Apparatus as claimed in claim 1 in which means are provided for enabling the radiation source to provide narrow pulses of radiation and the delay means has a delay time for the radiation equal to at least half the length of a pulse so that the radiation received at the signal detector means after traversing the respective paths is in the form of two time separated pulses.

5. Apparatus as claimed in claim 1 in which modulation means are provided for enabling the radiation source to provide a continuous output which is modulated so that the radiation received at the signal detector means after traversing the respective paths is a composite modulated signal.

6. Apparatus as claimed in claim 5 in which the modulation means comprises amplitude modulation means.

7. Apparatus as claimed in claim 1 in which a plurality of different sensing heads are provided each supplied from an associated Y-coupler positioned in the optical fibre and each arranged to provide measurements of a different element.

* * * * *